United States Patent [19]

Suda et al.

[11] Patent Number: 4,959,677
[45] Date of Patent: Sep. 25, 1990

[54] DEVICE FOR DETECTING THE FOCUS ADJUSTED STATE OF AN OBJECTING LENS

[75] Inventors: Yasuo Suda, Yokohama; Kazuhiko Arakawa, Kawasaki; Keiji Ohtaka, Tokyo; Takeshi Koyama, Tokyo; Ichiro Ohnuki, Tokyo, all of Japan

[73] Assignee: Canon Kabushiki Kaisha, Tokyo, Japan

[21] Appl. No.: 373,697

[22] Filed: Jun. 30, 1989

Related U.S. Application Data

[63] Continuation of Ser. No. 102,622, Sep. 30, 1987.

[30] Foreign Application Priority Data

Oct. 1, 1986 [JP] Japan ............................. 61-231328
Oct. 1, 1986 [JP] Japan ............................. 61-231329
Oct. 1, 1986 [JP] Japan ............................. 61-231330

[51] Int. Cl.⁵ .............................................. G03B 13/36
[52] U.S. Cl. ................................... 354/402; 354/406
[58] Field of Search ............... 354/400, 402, 403, 406, 354/407, 408

[56] References Cited

U.S. PATENT DOCUMENTS

| | | |
|---|---|---|
| 4,246,476 | 1/1981 | Stauffer . |
| 4,346,970 | 8/1982 | Kawabata et al. . |
| 4,544,255 | 10/1985 | Utagawa ............................. 354/406 |
| 4,552,445 | 11/1985 | Mukai et al. ........................ 354/406 |
| 4,580,043 | 4/1986 | Imai ..................................... 354/406 |
| 4,608,490 | 8/1986 | Nagasaki et al. ................... 354/406 |
| 4,634,255 | 1/1987 | Suda et al. .......................... 356/406 |
| 4,688,920 | 8/1987 | Suda et al. .......................... 354/406 |
| 4,698,492 | 10/1987 | Ohtaka et al. ....................... 354/407 |
| 4,699,493 | 10/1987 | Koyama et al. .................... 354/406 |
| 4,712,901 | 12/1987 | Ohtaka ................................ 354/408 |
| 4,743,932 | 5/1988 | Matsui ................................. 354/407 |
| 4,768,052 | 8/1988 | Hamada et al. ..................... 354/406 |
| 4,774,539 | 9/1988 | Suda et al. .......................... 354/406 |

FOREIGN PATENT DOCUMENTS 55-111927 4/1980 Japan .
55-118019 9/1980 Japan .
58-49844 3/1983 Japan .

Primary Examiner—Russell E. Adams
Attorney, Agent, or Firm—Fitzpatrick, Cella, Harper & Scinto

[57] ABSTRACT

In a focus detecting device has a plurality of optical systems each forming a pair of light distributions whose relative position varies in conformity with the focus adjusted state of an objective lens. The optical systems are disposed so that the direction in which the relative position of the light distributions is varied differs. Focus detecting sensors are provided for receiving the relative position of the light distributions, an the optical systems are constructed so that the optical spacing between the centers of gravity of the areas in which light beams passed through one of the optical systems differs from the optical spacing between the centers of gravity of the areas on another of the optical systems.

10 Claims, 12 Drawing Sheets

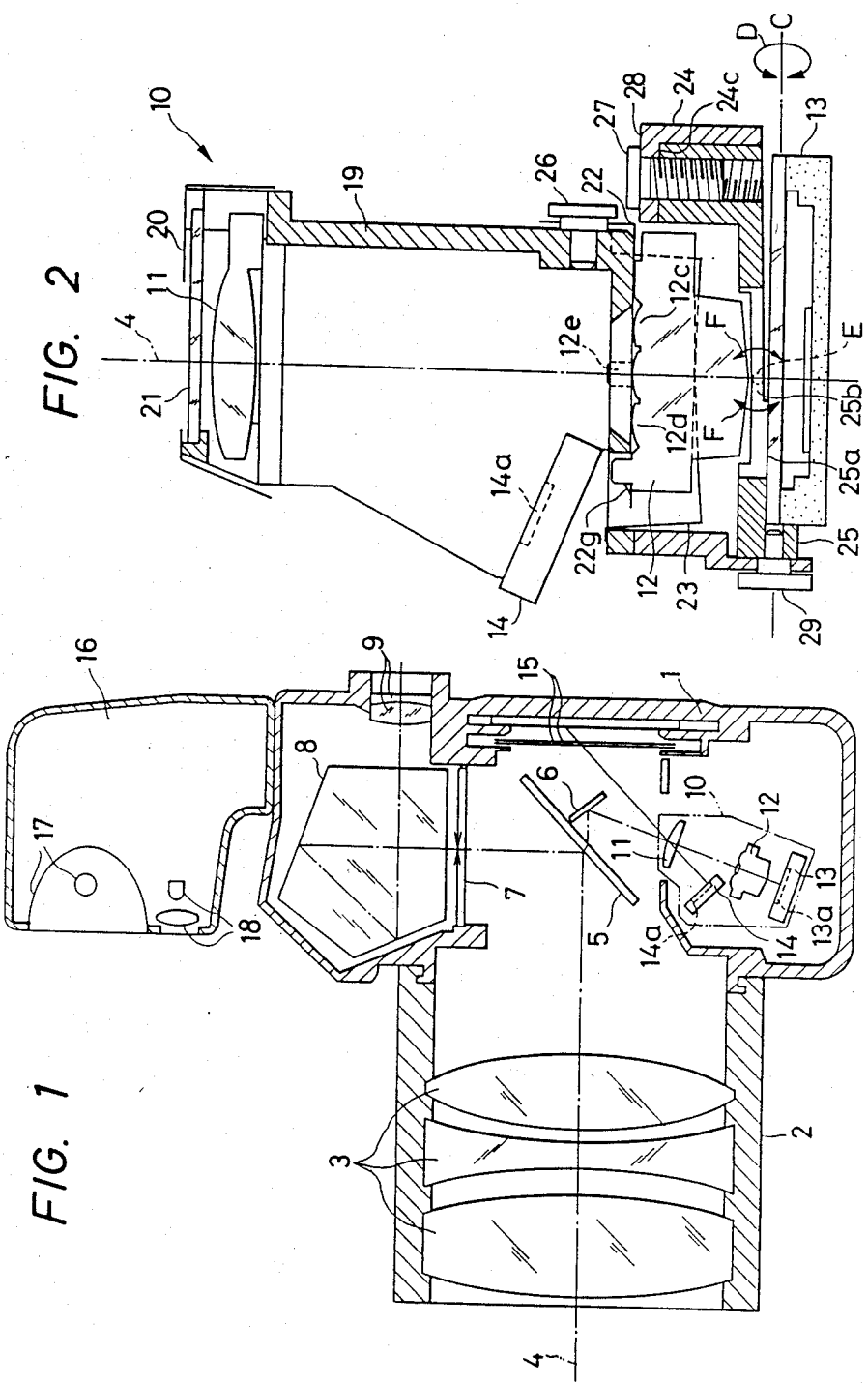

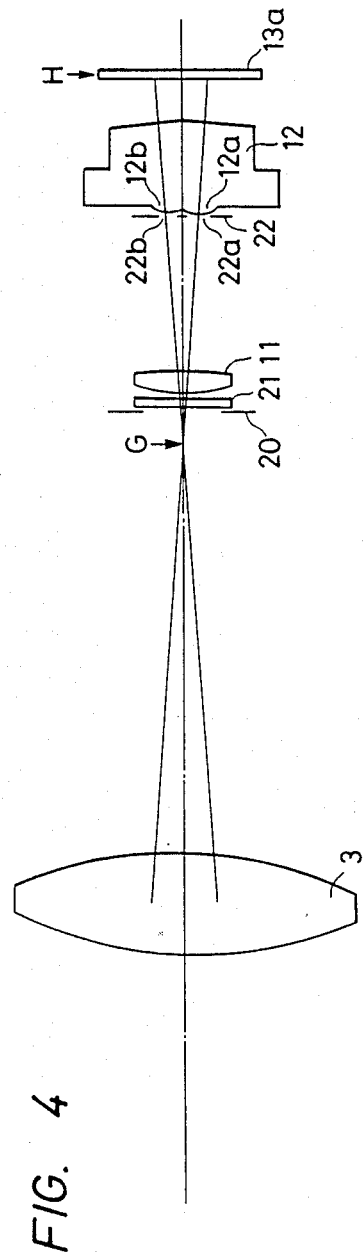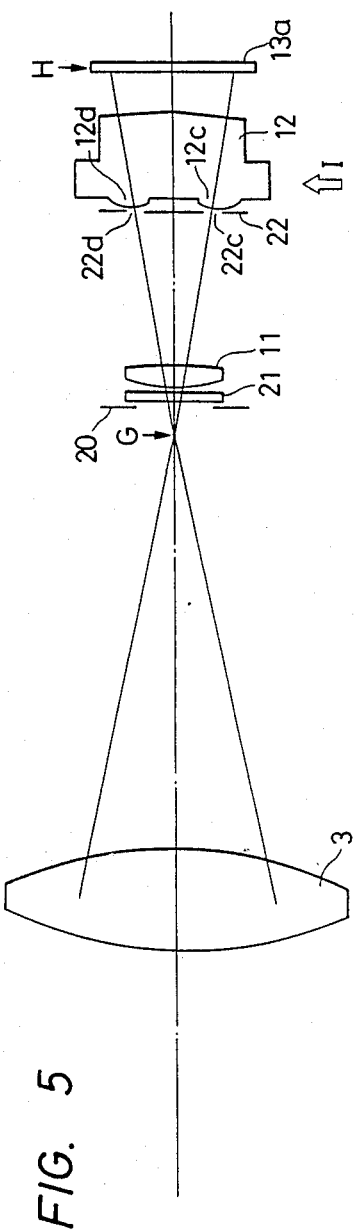
FIG. 4
FIG. 5

DEVICE FOR DETECTING THE FOCUS ADJUSTED STATE OF AN OBJECTING LENS

This application is a continuation-in-part continuation of application Ser. No. 102,622 filed Sept. 30, 1987, now abandoned.

BACKGROUND OF THE INVENTION

1. Field of the Invention

The present invention relates to a focus detecting device of the phase difference detection type for detecting the focus state on the basis of luminance distributions of an object in two different directions.

2. Related Background Art

Heretofore, for example, a focus detecting device of the phase difference detection type disposed in a camera has been designed such that the amount of defocus of a photo-taking lens is detected from the luminance distribution of an object to be photographed in only one direction. Therefore this device has suffered from the disadvantage that focus detection is impossible for an object having no luminance distribution in that direction. In view of this, the applicant has proposed in Japanese Patent application No. 235822/1985 a device in which, for example, a longitudinal pair of focus detecting line sensors and a lateral pair of focus detecting line sensors and a secondary imaging lens having a pair of lens portions for forming secondary images on the line sensors are disposed to detect the luminance distributions of the photographing picture plane in the lateral direction and the longitudinal direction and the amounts of defocus of the photo-taking lens can be detected from the outputs of the respective sensors. Thereby, even if one amount of defocus becomes uncalculatable depending on the then appearance and pattern of the object to be photographed, it is possible to obtain the amount of defocus from the other luminance distribution and therefore, it never happens that focus detection becomes impossible, and such a device may be said to be a very effective device.

Now, in the device as described above, design the is made such that the relative spacing between the secondary images formed on the pair of line sensors used for longitudinal distance measurement is the same as the spacing between the secondary images formed on the pair of line sensors used for lateral distance measurement, but improvements in focus detection accuracy have been expected.

On the other hand, techniques for reducing the assembly error of the device are disclosed in U.S. patent application Ser. No. 7/077,998 and U.S. Pat. No. 4,555,169.

SUMMARY OF THE INVENTION

It is a primary object of the present invention to provide a focus detecting device which can detect the focus state by a simple construction irrespective of the luminance pattern of an object and can improve the accuracy of the detection.

It is another object of the present invention to provide a focus detecting device in which even when respective pairs of focus detecting sensors are inclined with respect to a plane perpendicular to the optic axis due to assembly error or manufacturing errors the inclination can be adjusted and wrong detection of the focus state can be prevented from being effected.

The angle formed by and between the two pairs of line sensors of the above-described device can be finished accurately by forming these line sensors into one chip, but it is considerably difficult to accurately finish the lens portions of a secondary imaging lens which form a pair corresponding thereto. Therefore, where there is a manufacturing error in the secondary imaging lens, there is a risk that the relative positional relation between the line sensors which are to form a pair and the lens portions of the secondary imaging lens differ from each other and accurate focus detection cannot be accomplished. This also holds true of a device designed such that the amount of defocus of the photo-taking lens is detected from the luminance distribution of an object to be photographed in only one direction.

It is still another object of the present invention to provide a focus detecting device which can adjust the relative positional relation between the focus detecting sensors and the secondary imaging lens.

BRIEF DESCRIPTION OF THE DRAWINGS

FIG. 1 is a cross-sectional view showing an embodiment of the present invention.

FIG. 2 is a cross-sectional view of the AF photometric unit shown in FIG. 1.

FIG. 4 is a developed view of one optical path of the AF system in the AF photometric unit.

FIG. 5 is a developed view of the other optical path.

DESCRIPTION OF THE PREFERRED EMBODIMENTS

Figure 3:
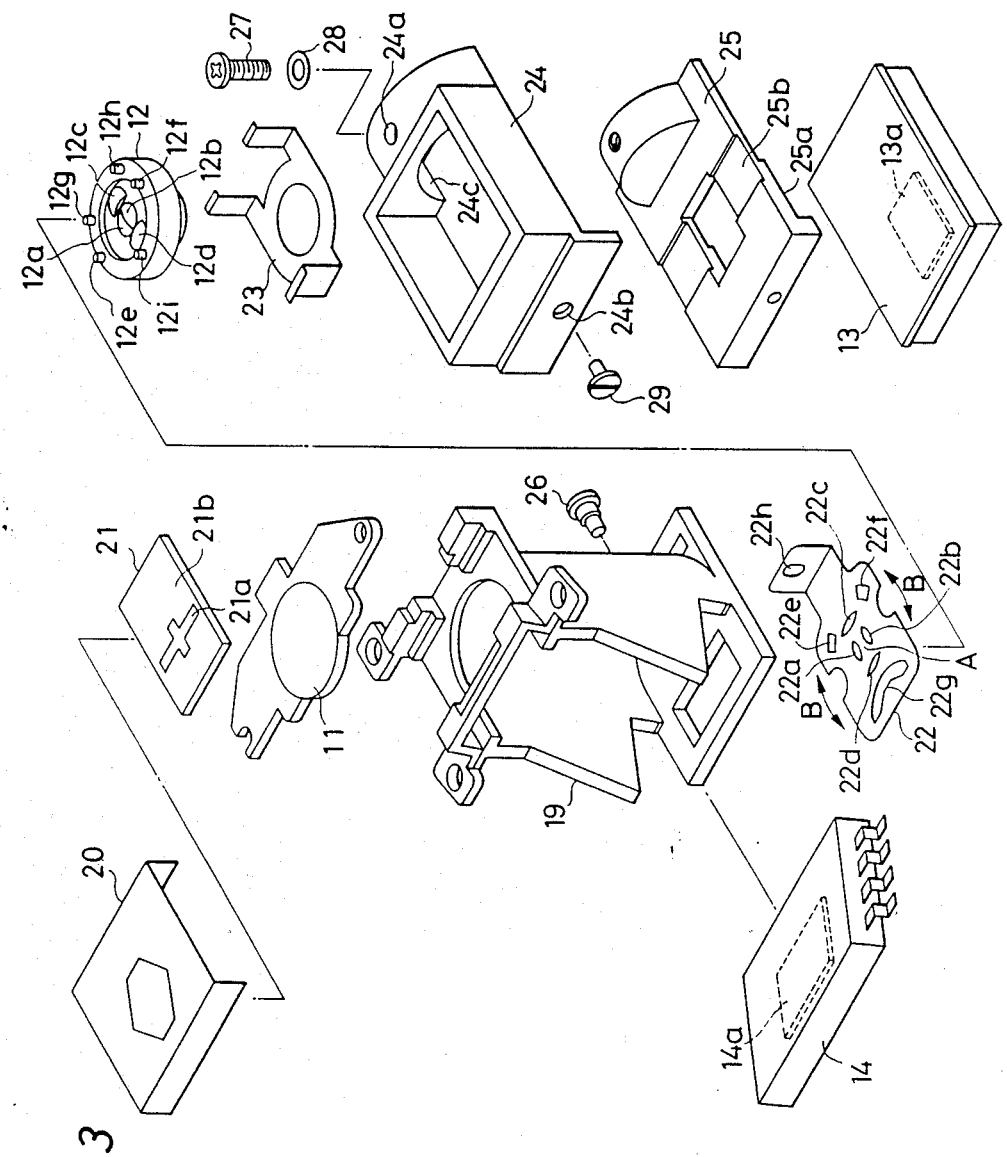
FIG. 3 is a developed perspective view illustrating the structure of the AF photometric unit.

The present invention will hereinafter be described in detail with respect to an embodiment thereof shown in the drawings.

FIGS. 1 to 3 show an embodiment of the present invention, FIG. 1 being a cross-sectional view showing a state in which a flash device has been mounted. In FIG. 1, reference numeral 1 designates a camera body, and reference numeral 2 denotes a lens barrel for holding a photo-taking lens 3 for movement in the direction of the optic axis numeral 5 designates a main mirror cooperating with a sub-mirror 6 to separate the object light passed through the photo-taking lens 3 into a finder system and an AF photometric system at a mirror-down position. Reference numeral 7 denotes a focusing screen constituting the finder system together with a pentaprism 8 and an eyepiece 9. Reference numeral 10 designates an AF photometric unit forming an AF photometric system (herein a TTL flash control system and an AE system are referred to as the photometric system) having a sensor 13 for AF and AE having a sensor portion 13a, etc. in which are disposed a field lens 11, a secondary imaging lens 12, a line sensor for AF and a line sensor for AE (the details of which will be described later) and having a TTL flashlight control sensor 14 having a sensor portion 14a, etc. Reference numeral 15 denotes a shutter, reference numeral 16 designates a flash device, reference numeral 17 denotes a flash emitting portion, and reference numeral 18 designates an infrared ray auxiliary light emitting portion for AF.

FIGS. 2 and 3 are detailed views of only the essential portions of the AF photometric unit 10 shown in FIG. 1, FIG. 2 being a cross-sectional view thereof, and FIG. 3 being a developed perspective view thereof.

On the upper surface side of a body block 19, a field mask 20, an infrared cut filter 21 having areas 21a and 21b differing in transmission factor, and the field lens 11 are mounted in the named order. On the lower surface side of the body block 19, a stop 22, the secondary imaging lens 12, a keep spring 23, a sensor block 24, a sensor holder 25 and the sensor 13 for AF and AE are mounted in the named order. Further, on the body block 19, the TTL flash control sensor 14 is mounted at a position capable of receiving the reflected light from a film surface through the field lens 11.

The stop 22 has pairs of openings 22a, 22b and 22c, 22d provided orthogonally to each other as shown in FIG. 3 and also has positioning portions 22e, 22f having an arc whose radius is a point coincident with the center A of these openings, a spring portion 22g and a slot 22h. The secondary imaging lens 12 having lens portions 12a-12d is positioned by pins 12e and 12f with the stop 22 nipped between it and the body block 19, and is fixed by the keep spring 23 (see FIG. 2). In such a state, the lens portions 12a-12d of the secondary imaging lens 12 are in a positional relation (the details of which will be described later) corresponding to the openings 22a-22d, and the pins 12g and 12h of the secondary imaging lens 12 are inserted in the positioning portions 22e and 22f, respectively, and the pin 12i of the secondary imaging lens 12 is inserted in the spring portion 22g. By the pin 12i being inserted in the spring portion 22g, the spring portion 22g is deformed to produce a force which biases the stop 22 toward the positioning portions 22e and 22f. Accordingly, an eccentric pin 26 is inserted into a hole in the body block 19 through the slot 22h of the stop 22 and is rotated, whereby minute angular rotation (in the direction of arrow B in FIG. 3) of the stop 22 about the center A of the openings of the stop 22 becomes possible.

The sensor block 24 and the sensor holder 25 are disposed below the secondary imaging lens 12 as previously described, and these together with a mounting screw 27, a washer 28 and an eccentric pin 29 constitute a mechanism for regulating the inclination of the sensor 13 for AF and AE disposed therebelow. The sensor 13 for AF and AE is adhesively secured to the mounting surface 25a of the sensor holder 25, and this sensor holder 25 is fixed to the arcuate mounting surface 24c of the sensor block 24 having mounting holes 24a and 24b by the mounting screw 27 and the washer 28 through said mounting hole 24a.

The center R of the arcuate mounting surface 24c is an axis C supposedly depicted in FIG. 2 and the mounting hole 24a of the sensor block 24 is a slot and therefore, regulation of inclination in the direction of arrow D in FIG. 2 is possible. Further, the sensor holder 25 is fixed to the sensor block 24 also by the eccentric pin 29 through the mounting hole 24b which is a slot like the mounting hole 24a, and the thickness of the bent portion 25b of the sensor holder 25 is made sufficiently small to provide flexibility and therefore, by rotating the eccentric pin 29, regulation of inclination in the direction of arrow F in FIG. 2 substantially about an axis E supposedly depicted in FIG. 2 is possible.

The TTL flash control system, the AF system and the AE system in the AF photometric unit 10 of the above-described construction will hereinafter be described.

The TTL flash control system (hereinafter referred to as the flashlight control system) will first be described. The flash control system is for introducing the reflected light from the film surface during flash photography into the sensor portion 14a of the flash control sensor 14 by the field lens 11 and stopping the light emission of the flash device 16 by the quantity of received light thereof. That is, when the main mirror 5 and the sub-mirror 6 are moved up and the forward curtain of the shutter 15 is moved and the flash device 16 emits a light with the film being exposed, the object image is formed on the film and the reflected light thereof is produced. Some of the reflected light passes through the field mask 20, the infrared cut filter 21 and the field lens 11 of the AF photometric unit 10 shown in FIG. 2 to the sensor portion 14a of the flash control sensor 14 and, when it is detected by a microcomputer to be described that for example, the quantity of received light has reached a predetermined photometric amount, a light emission stopping signal is output to the flash device 16 to stop the light emission thereof.

As can be seen from what has been previously described, the field lens 11 used in the AF system and the AE system are also used in the TTL flash control system and therefore, the photometric sensitivity distribution can be made good with compactness and low cost of the camera realized.

Figure 6:
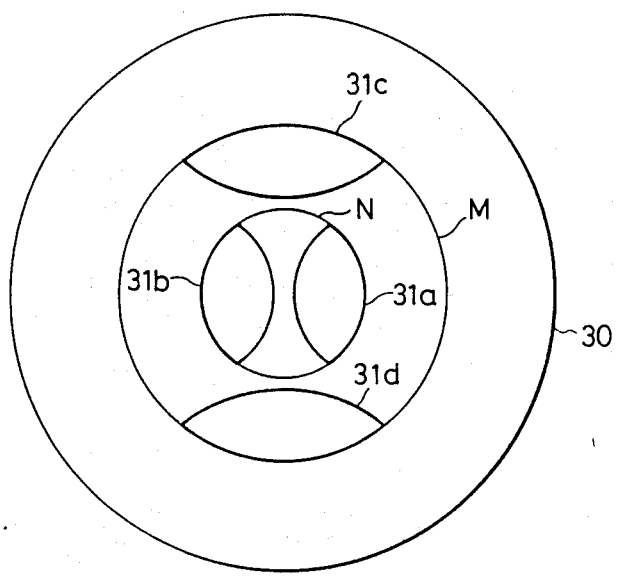
FIG. 6 illustrates the pupil area division.

The AF system will now be described. FIGS. 4 and 5 are developed views of the optical paths of the AF system. The secondary imaging lens 12, as shown in FIG. 3, has pairs of lens portions 12a, 12b and 12c, 12d disposed orthogonally to each other, and FIG. 4 shows a cross-section including the optic axes of the lens portions 12b. 12b, and FIG. 5 shows a cross-section including the optic axes of the lens portions 12c and 12d. In these figures, for simplicity of illustration, only a light ray which passes through the center of each opening of the stop 22 and whose object hight in the primary imaging surface is 0 is depicted, and the position indicated by arrow G is the primary imaging surface, and arrow H indicates the sensor surface of the sensor 13 for AF and AE. The openings 22a-22d of the stop 22 correspond to the lens portions 12a-12d, respectively, of the secondary imaging lens 12, as previously described, whereby four secondary images are formed on the sensor portion 13a, and the boundaries between these secondary images are separated by the image of the opening of the field mask 20. The spacing between the openings 22a and 22b of the stop 22 which form a pair similar in shape is narrower than the spacing between the openings 22c and 22d, and these openings are projected onto the pupil of the photo-taking lens 3 by the field lens 11. This state is shown in FIG. 6. In FIG. 6, reference numeral 30 designates the exit pupil of the photo-taking lens 3, and 31a-31d denote the areas on the pupil plane which correspond to the openings 22a-22d, respectively, of the stop 22. In the case of a photo-taking lens for a popular camera, the areas M and N may be chosen to the order of F4 and F8, respectively.

Figure 7:
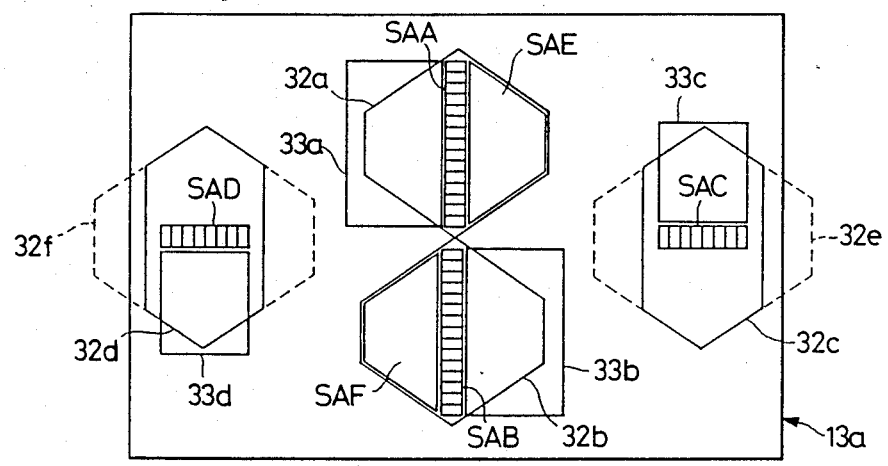
FIG. 7 illustrates the relation between the sensors for AF and AE shown in FIG. 1 and a secondary image.

FIG. 7 shows the state of the secondary image on the sensor portion 13a of the sensor 13 for AF and AE. Line sensors SAA, SAB and SAC, SAD for AF for effecting longitudinal distance measurement and lateral distance measurement and two sensors SAE. SAF for AF adjacent to the line sensors SAA, SAB (with the distance measuring area interposed therebetween) are disposed on the sensor portion 13a, and secondary images 32a-32d are projected thereonto by the secondary imaging lens 12. The secondary images 32a and 32b are the object images on the pupil of the photo-taking lens 3 by light beams passed through the areas 31a and 31b, and the secondary images 32c and 32d are the object images by light beams passed through the areas 31c and 31d. The portions indicated by broken lines 32e and 32f are image areas eclipsed by the sub-mirror 6. Reference characters 33a-33d shown on the sensor portion 13a designate sensor driving circuits for the line sensors SAA-SAB, and a light-intercepting aluminum layer is formed thereon so that the incidence of light onto these portions may not affect the sensor outputs.

Figure 8:
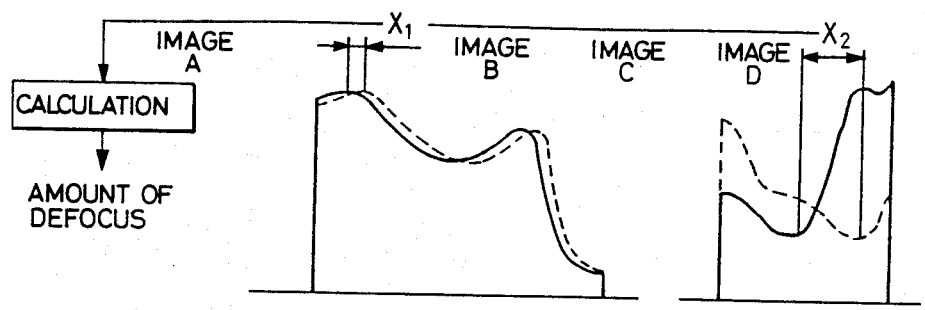
FIG. 8 illustrates image signals used during the calculation of the amount of defocus.

FIG. 8 illustrates the calculation of the amount of defocus. In this figure, the outputs of the line sensors SAA-SAD are represented as images A-D, respectively. As described in connection with FIG. 6, the images A and B are formed by light beams passed through the areas 31a and 31b on the pupil, while the images C and D are formed by light beams passed through more outer areas 31c and 31d and therefore, the amount of image deviation relative to the defocus of the photo-taking lens 3 is greater for the images C and D than for the images A and B. That is, in FIG. 8, the phase difference $X_2$ is greater than the phase difference $X_1$. The information of these phase differences $X_1$ and $X_2$ is transmitted through the sensor driving circuits 33a-33d to a microcomputer to be described, where calculation of the amount of defocus is effected and focus control of the photo-taking lens 3 is executed, but where distance measurement is effected by both of the line sensors SAA, SAB and SAC, SAD, the result of calculation from the images C and D is greater in the amount of image deviation and therefore, the use of this result will lead to higher focus detection accuracy.

Figure 9:
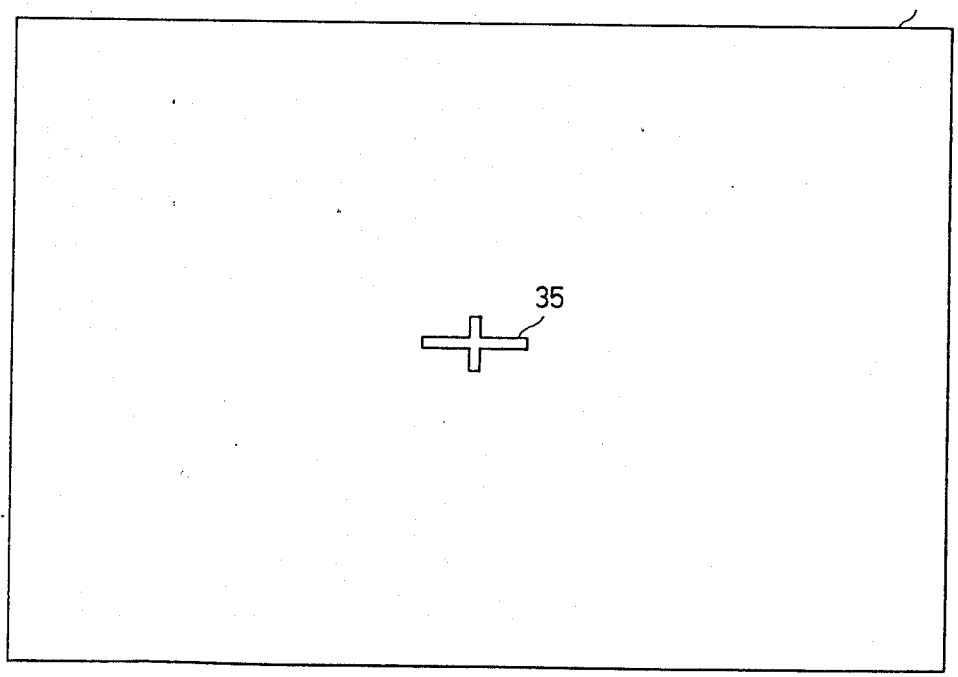
FIG. 9 shows the distance measuring area in the finder view field.

FIG. 9 shows the distance measuring area in the finder view field of the camera. In FIG. 9, reference numeral 34 designates the finder view field of the camera, and reference numeral 35 denotes the distance measuring area supposedly depicted in the finder view field 34. The lateral (horizontal) distance measuring area is coincident with the reversely projected images of the line sensors SAA and SAB, and the longitudinal (vertical) distance measuring area is coincident with the reversely projected images of the line sensors SAC and SAD.

Actually the distance measuring area 35 is written as a figure into the focusing screen 7 of FIG. 1.

Figure 10:
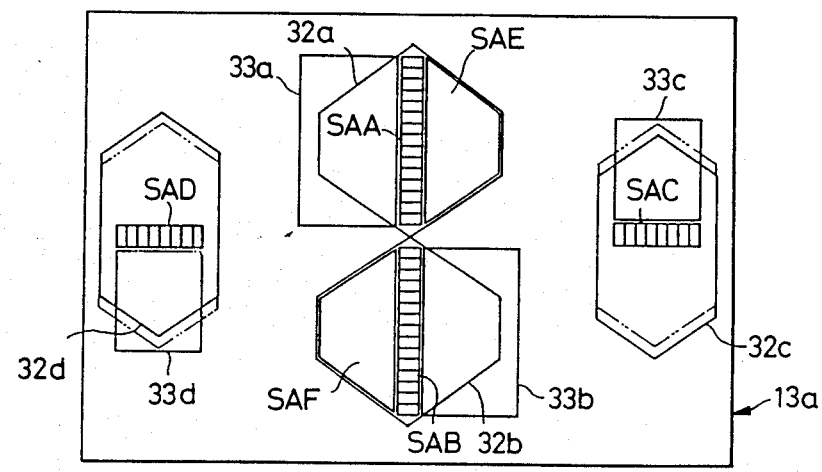
FIG. 10 illustrates the relation between the sensors for AF and AE and the secondary image when there is a manufacturing error in the secondary imaging lens shown in FIG. 1.
Figure 11A:
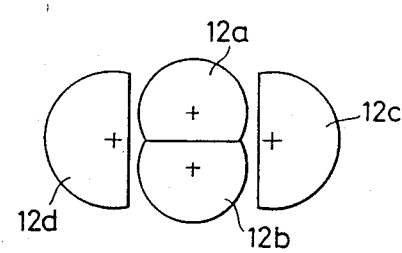
FIG. 11A is a plan view showing an ideal secondary imaging lens free of manufacturing error.
Figure 11B:
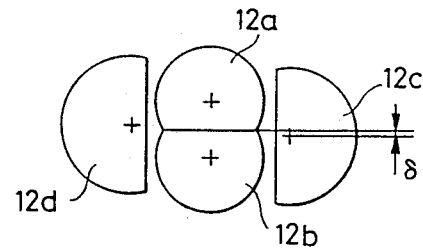
FIG. 11B is a plan view showing a secondary imaging lens haivng a manufacturing error.
Figure 12:
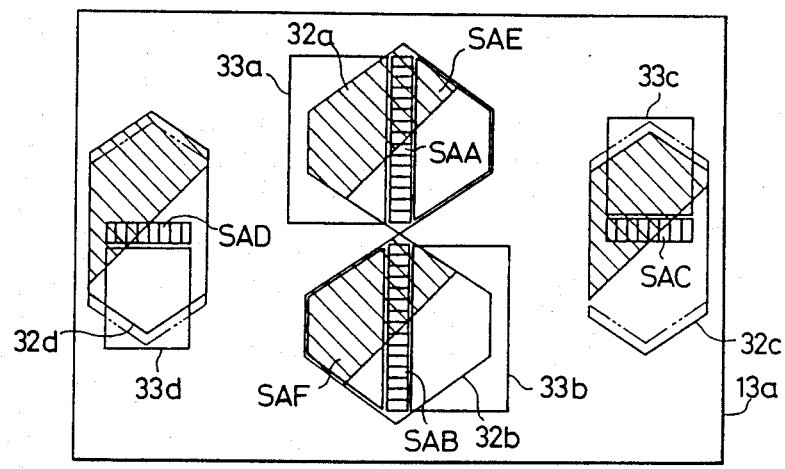
FIG. 12 illustrates the object image when the secondary imaging lens of FIG. 11B is used.

FIG. 10 shows the state on the sensor portion 13a of the sensor 13 for AF and AE when a manufacturing error is caused in the secondary imaging lens 12. That is, it is supposed that a case where the ideal positional relation between the lens portions in the secondary imaging lens 12 as shown in FIG. 11(a) causes an error (for the openings 22a-22d of the stop 22) as shown in FIG. 11(b). When there is thus no degree of rectangularity of the lens portions 12a, 12b and 12c, 12d, the degree of rectangularity of the secondary images 32a, 32b and 32c, 32d also becomes bad as shown in FIG. 10. Accordingly, if the positions of the line sensors SAA and SAB are adjusted to the secondary images 32a and 32b, the alignment of the line sensors SAC and SAD with the secondary images 32c and 32d will become impossible. Thus, different portions of the object to be photographed are projected onto the line sensors SAC and SAD, and a focusing error is caused when the object image of a brightness pattern having oblique lines as shown in FIG. 12 is incident on the distance measuring area, and this is inconvenient. So, in such a case, the stop 22 is rotated in the direction of arrow B in FIG. 3 and the alignment of the secondary images 32c and 32d with the line sensors SAC and SAD is effected.

Figure 13:
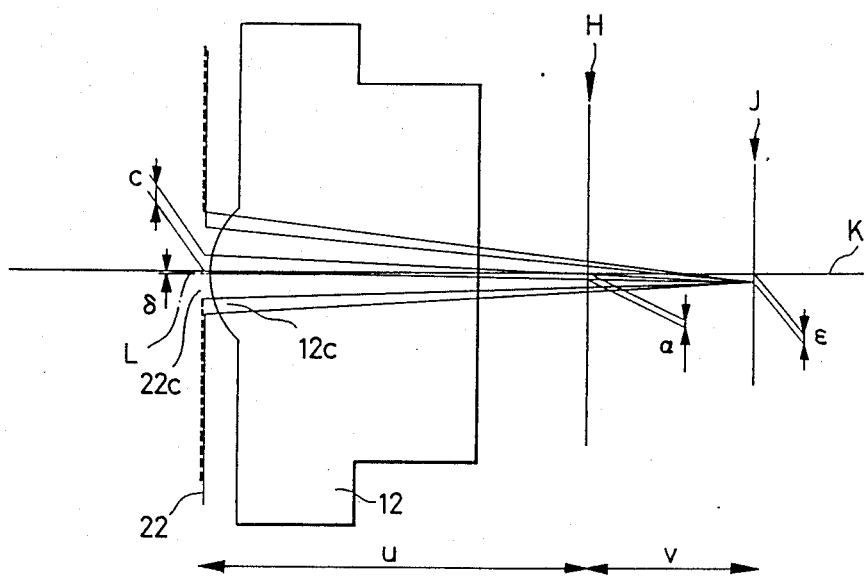
FIG. 13 illustrates the amount of position adjustment of the secondary image and the line sensor when the secondary imaging lens of FIG. 11B is used.

FIG. 13 is a view for helping the previous description (alignment), and is a view of the secondary imaging lens 12 as seen from the direction of arrow I in FIG. 5. In FIG. 13, letter J designates the secondary imaging surface of the lens portions 12c and 12d, and thus, the imaging plane of the lens portions 12c and 12d lies rearwardly of the sensor plane H of the sensor 13 for AF and AE, and a defocused image is projected onto the sensor plane H. On the other hand, the imaging plane of the lens portions 12a and 12b coincides with the sensor plane H, and an image in focus is projected onto the line sensors SAA and SAB. In other words, so as to be able to correct the manufacturing error of the secondary imaging lens 12, the design is made such that the imaging surface of the lens portions 12a and 12b is coincident with the sensor plane H and the imaging plane of the lens portions 12c and 12d lies rearwardly (or forwardly) of the sensor plane H, that is, a defocused image is projected onto the sensor plane H. In this figure, K is an axis determined by the lens portions 12a and 12b, L is the axis of the lens portion 12c, u is the distance from the position of the stop 22 to the sensor plane H, and v is the distance from the sensor plane H to the secondary imaging plane J.

Assuming that deviation $\epsilon$ of the image position on the secondary imaging plane J is caused when the axis L of the lens portion 12c is eccentric by $\delta$, the following relation is established with $\beta$ as the secondary imaging magnification:

$$\epsilon = \delta(1+\beta) \tag{1}$$

At this time, the deviation of the image position on the sensor plane H is $\alpha(=\epsilon \cdot u/(u+v))$. This deviation can be varied by moving the positions of the openings 22c and 22d of the stop 22 because the image is defocused. Consequently, if the image positionally deviated by $\epsilon$ on the secondary imaging plane J is adjusted so as to intersect the axis K on the sensor plane H, there will be no focusing error even if the object image is incident with the oblique lines shown in FIG. 12, and for this purpose, the opening 22c of the stop 22 may be moved by c, and this amount of movement c can be found from the following equation. That is, representing the amount of movement c by the distances u and v, the amount of eccentricity $\delta$ and the secondary imaging magnification $\beta$, $$\epsilon/v = c/u \quad c = u \cdot \epsilon/v. \tag{2}$$

From the above-mentioned equations (1) and (2), $$c = u\delta(1+\beta)/v. \tag{3}$$

Movement of the stop 22 (the openings 22c and 22d) by the amount of movement c obtained from the aforementioned equation is possible by rotating the eccentric pin 26 shown in FIG. 3. At this time, the other secondary images 32a and 32b are not affected by the rotation of the stop 22 because an image in focus is formed on the sensor surface H. Even if the position of the sensor 13 for AF and AE in the direction of the optic axis is deviated by the manufacturing error, the movement of the openings 22a and 22b of the stop 22 resulting from the rotation of the stop 22 is relatively small and the resultant deviation of the image position is minute because the openings 22a and 22b of the stop 22 forming the secondary images 32a and 32b are positioned inside (relative to the openings 22c and 22d).

Figure 22:
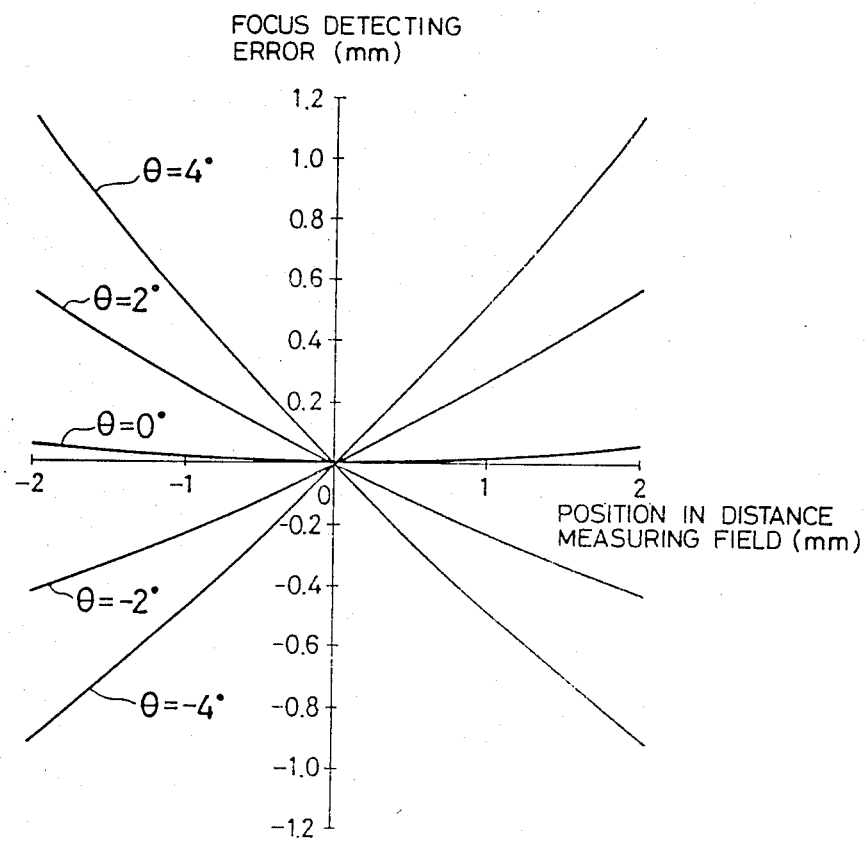
FIG. 22 is a graph for illustrating the amount of focus detection error in a case where the sensor portion shown in FIG. 2 is inclined with respect to the optic axis.

FIG. 22 illustrates the amount of focus detection error when the sensor portion 13a is disposed while being inclined with respect to the optic axis. In FIG. 22, the abscissa represents the distance measuring point in the distance measuring field, and the ordinate represents the amount of focus detection error with the inclination $\theta$ of the sensor portion 13a by the assembly error or the like in the direction of arrow D centered at the axis C shown in FIG. 2 or the direction of arrow F centered at the axis E as a parameter. When an inclination of the sensor portion 13a with respect to the optic axis has occurred, that is, when substantially the line sensors SAA and SAB or SAC and SAD are inclined in their lengthwise directions, a focus detection error arises, and the inclination in the direction of arrow E corresponds to the error of the lateral distance measuring field, and the inclination in the direction of arrow F corresponds to the error of the longitudinal distance measuring field. These inclinations can be adjusted by the adjusting mechanism described in connection with FIGS. 2 and 3. The fact that the amount of in-focus error relative to the position in the distance measuring field varies in conformity with the inclinations of the sensors in this manner shows that even if a variation in the in-focus position within the distance measuring field is caused by the inclination or eccentricity of the secondary imaging lens 12, such variation can be corrected by adjustment of the inclinations of the sensors.

Figure 14:
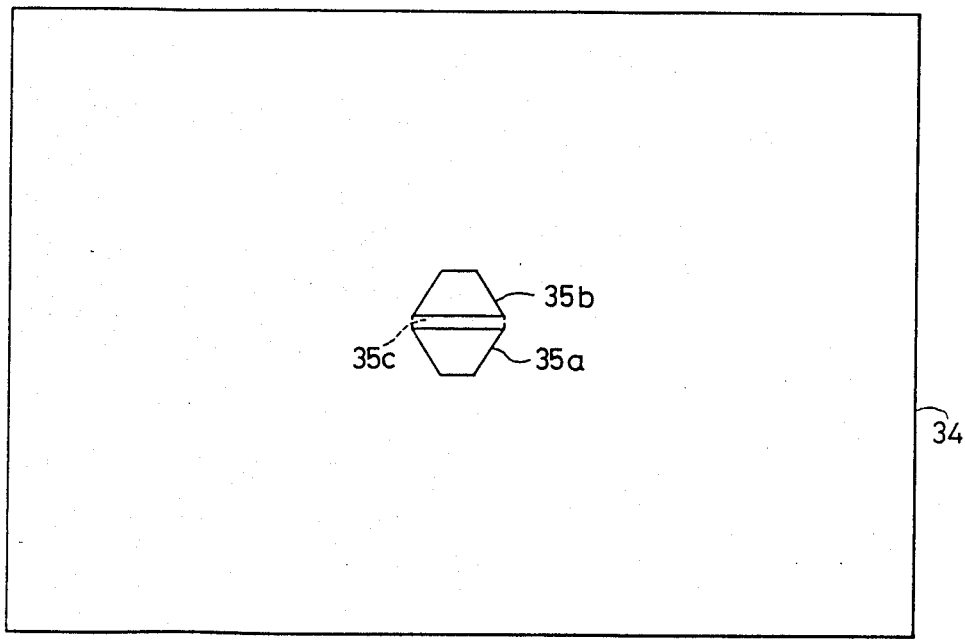
FIG. 14 shows the photometering area in the finder view field.

The AE system will now be described. The sensors SAE and SAF for AE, as described in connection with FIG. 7, are disposed adjacent to the line sensors SAA and SAB, and the image of the opening of the field mask 20 (the object image passed through the opening configuration) is projected thereonto by light beams passed through the openings 22a and 22b of the stop 22, i.e., light beams passed through the areas 31a and 31b on the exit pupil shown in FIG. 6. Accordingly, the photometering area comprising a combination of the sensors SAE and SAF for AE assumes a spot-like shape as shown in FIG. 14, more strictly, the image of the opening of the field mask 20 from which a rectangular area 35c corresponding to the line sensors SAA and SAB is eliminated in the finder view field 34 (the areas indicated by 35a and 35b in FIG. 14). The area of the rectangular area 35c is considerably small and therefore, as the photometric sensitivity distribution, it can be regarded as the opening configuration of the field mask 20. Consequently, during spot photometry photography, control of the exposure time is effected on the basis of the value photometered by this photometering area, that is, control of the shutter 15 and the stop, not shown, is effected by a microcomputer which will be described later. By arranging the sensor driving circuits 32a and 32b for the line sensors SAA and SAB and the sensors SAE and SAF for AE alternately on one side in this manner, the combined sensitivity distribution (the photometering area) thereof can be made into the central portion of the picture plane (the center of the photographing field) surrounding the distance measuring area. Consequently, during spot photometric photography, exposure time control is effected on the basis of the value photometered by this photometering area, that is, control of the shutter 15 and the stop, not shown, is effected by a microcomputer to be described.

Figure 15:
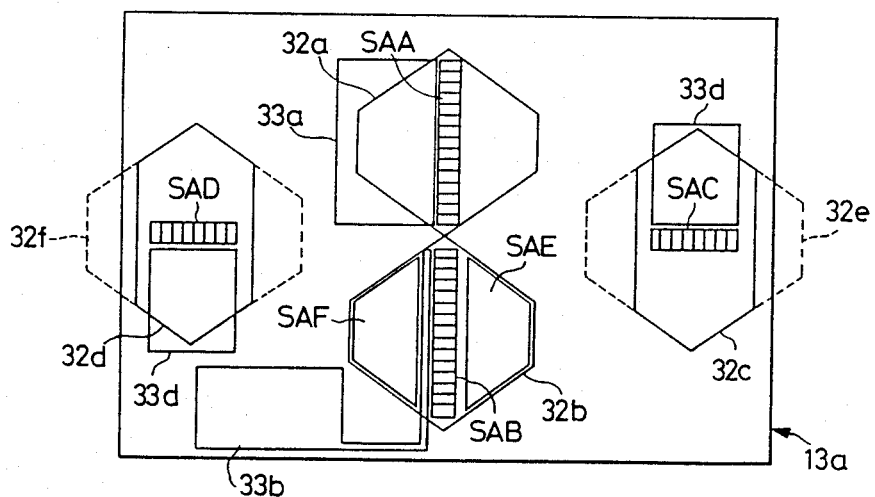
FIG. 15 shows another example of the arrangement relation between the line sensors for AF and the sensors for AE.
Figure 16:
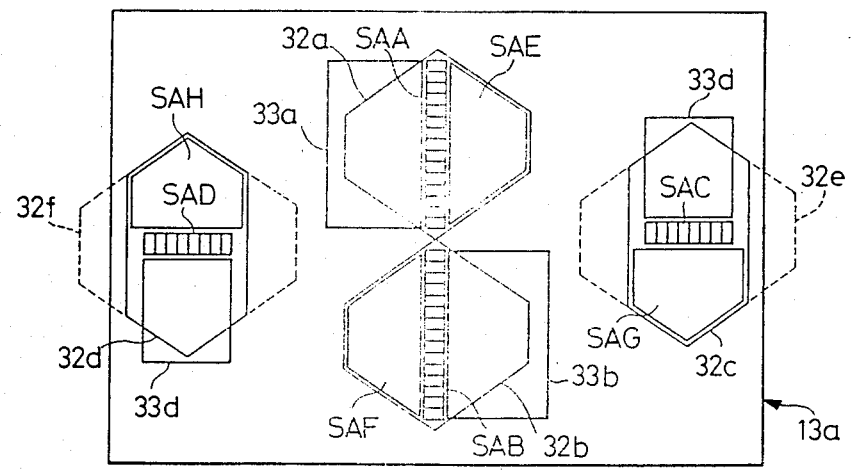
FIG. 16 shows still another example of the arrangement relation between the line sensors for AF and the sensors for AE.
Figure 17:
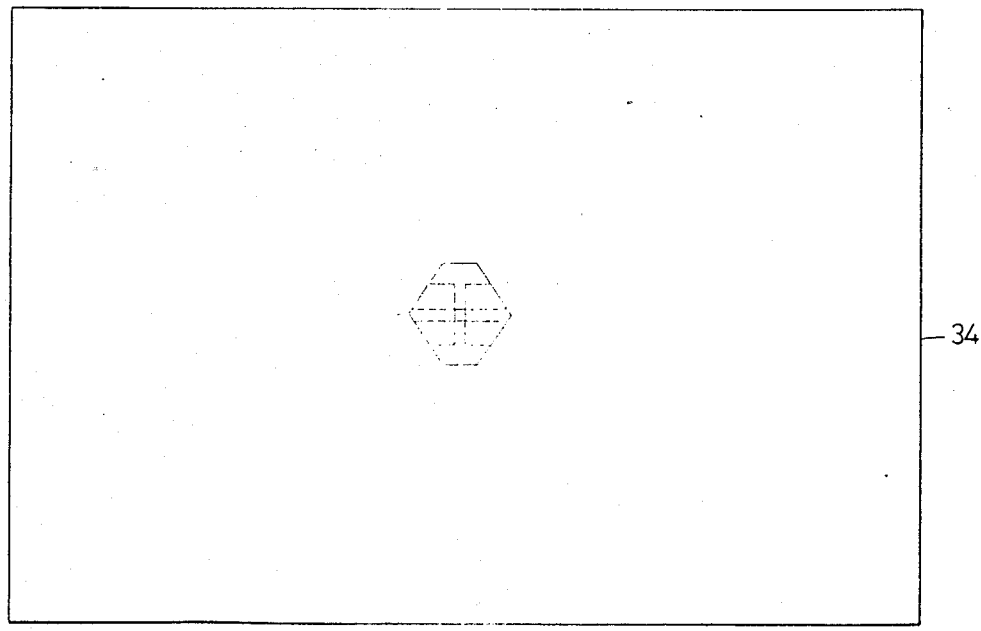
FIG. 17 shows the photometering area in the finder view field in the example shown in FIG. 16.

FIG. 15 shows another embodiment in which the relations between the photometering areas by the line sensors SAA and SAB shown in FIG. 7 and the photometering areas by the sensors SAE and SAF for AE are identical. FIG. 16 shows still another embodiment in which sensors SAG and SAH for AE are newly added alternately on one side to the sensor driving circuits 32c and 32d for the line sensors SAC and SAD. The combined photometering area of the sensors SAE, SAF and SAG, SAH for AE assumes a substantially spot-like shape as shown in FIG. 17. Again in these embodiments, the combined sensitivity distribution (the photometering area) thereof can be made into the central portion of the picture plane (the center of the photographing field) surrounding the distance measuring area.

Now, in the present embodiment, the flash control system, the AF system and the AE system share their optical path, but it is necessary that the wavelength range of the light entering the respective sensors be limited for each of those systems. That is, as regards the flash control system and the AE system, it is desirable that the spectral sensitivity characteristic thereof be made coincident with the spectral sensitivity characteristic of the film, while as regards the AF system, it must have sensitivity to near-infrared light because, for example, near-infrared auxiliary light is used for a low brightness object to be photographed. For the reason that as much light as possible should be introduced (to enhance the distance measurement accuracy) even in a case where near-infrared auxiliary light is not used, it is desirable to have sensitivity to near-infrared light. Generally, a sensor has sensitivity even to lights of wavelengths exceeding 1000 nm and therefore, infrared light must be cut by an optical filter.

Figure 18:
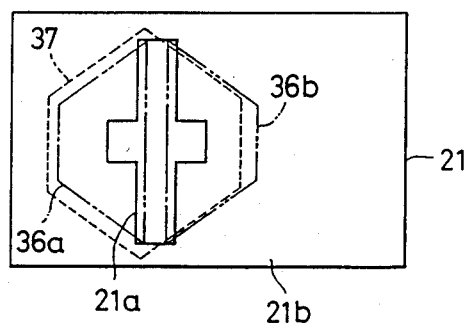
FIG. 18 is a top plan view showing the various areas of the infrared cut filter shown in FIG. 2.
Figure 19:
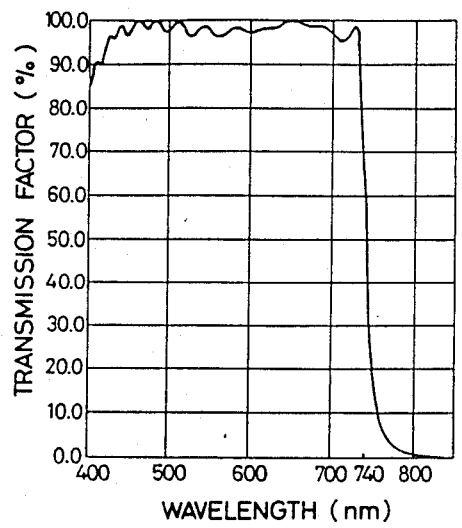
FIGS. 19 and 20 show the spectral transmittance characteristics in the respective areas of the infrared cut filter.
Figure 20:
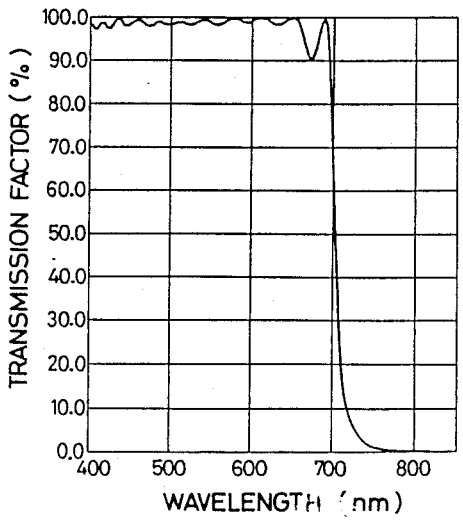

FIG. 18 shows an infrared cut filter 21 capable of achieving the above-mentioned requirement. In this figure, reference characters 36a and 36b designate effective portions in the AE system, and reference numeral 37 denotes an effective portion in the flash control system. This infrared cut filter 21 comprises two areas 21a and 21b of different spectral transmission factor characteristics, and the area 21a has a characteristic as shown, for example, in FIG. 19, and the area 21b has a characteristic as shown in FIG. 20. That is, the infrared ray cut wavelength of the area 21a is 740 nm, and the infrared ray cut wavelength of the area 21b is 700 nm. As shown in FIG. 18, the effective portions of the flash control system and the AE system lie astride two areas, but in any of them, the rate occupied by the area 21a is small relative to the area 21b and therefore, it is possible to effect photometry with a characteristic approximate to the spectral sensitivity characteristic (400-700 nm) of the film. In contrast, the effective portion of the AF system is designed so as to be completely included in the area 21a as can be seen from the shape of the area 21a, and consideration is given so that there is no irregularity of illumination on the surfaces of the line sensors.

Figure 21:
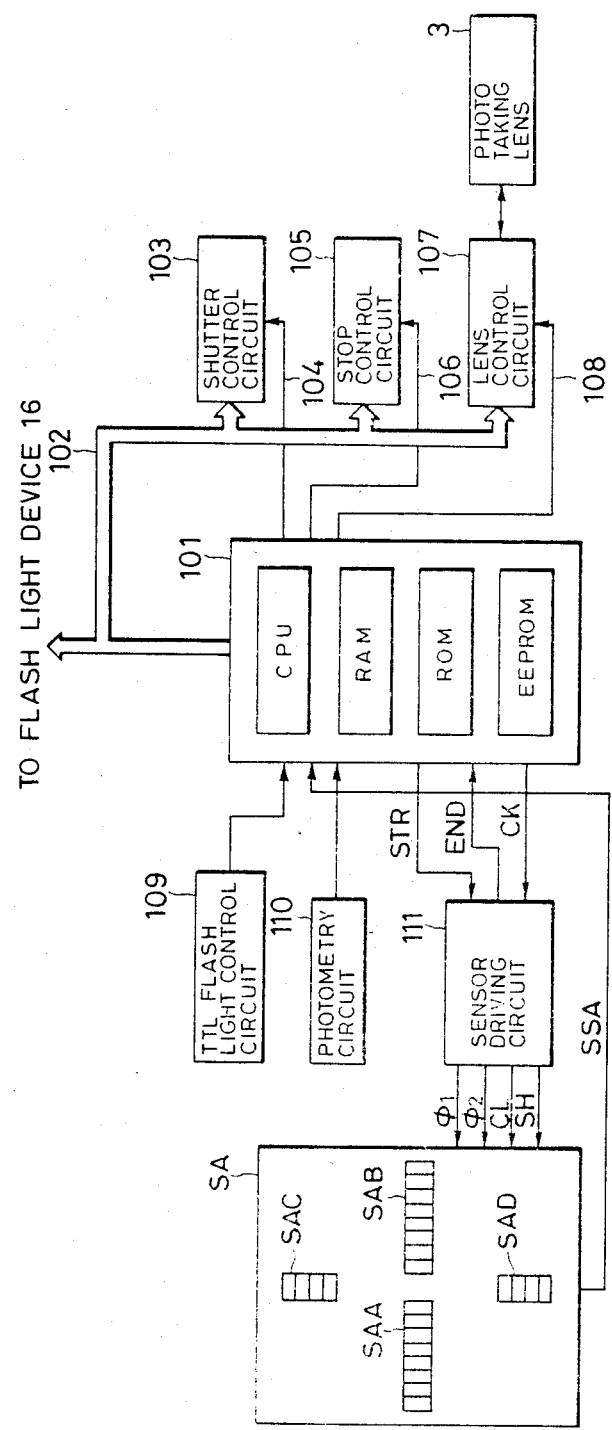
FIG. 21 is a block diagram schematically showing an embodiment of the present invention.

FIG. 21 is a block diagram schematically showing the essential portions of a single lens reflex camera having the above-described construction. Reference numeral 101 designates a control circuit for controlling various operations of the camera. It is, for example, a one-chip microcomputer containing therein a CPU (central processing unit), an RAM, an ROM, an EEPROM and input and output ports, and a series of controlling softwares and parameters including AF and photometric control are stored in the ROM and EEPROM. Reference numeral 102 denotes a data bus, reference numeral 103 designates a shutter control circuit for receiving data input through the data bus 102 while a control signal 104 is input from the control circuit 101 and controlling the movement of the forward and rearward curtains of the shutter 15 on the basis of said data, reference numeral 105 denotes a stop control circuit for receiving data input through the data bus 102 while a control signal 106 is input and controlling a stop mechanism, not shown, on the basis of said data, and reference numeral 107 designates a lens control circuit for receiving data input through the data bus 102 while a control signal 108 is input and controlling the position of the photo-taking lens 3 in the direction of the optic axis 4 on the basis of said data. Reference numeral 109 denotes a TTL flash control circuit comprising the aforedescribed flash control sensor 14, etc., and reference numeral 110 designates a photometry circuit for AE comprising the aforedescribed sensors SAE and SAF for AE, etc. The photometering signal photoelectrically converted by these is supplied to the control circuit 101, in which it is used as the data for controlling the shutter control circuit 103, the stop control circuit 105 and the flash device 16.

Reference numeral 111 designates a sensor driving circuit for controlling the two sets of line sensors SAA, SAB and SAC, SAD each comprising a CCD, in accordance with each signal input from the control circuit 101.

A series of photographing operations will now be described briefly. When a first stroke of a release button, not shown, is effected, the light beam passed through the photo-taking lens 3, the main mirror 5, the sub-mirror 6, the field lens 11, the secondary imaging lens 12, etc. enters the sensors SAE and SAF for AE, and a photometric signal photoelectrically converted, i.e., the object brightness information, is supplied from the photometry circuit 110 to the control circuit 101.

Substantially simultaneously therewith, the control circuit 101 drives through the sensor driving circuit 111 the line sensor SA on which the object image is incident through a similar optical path, in order to obtain the phase difference $X_1$ between the image A and the image B and the phase difference $X_2$ between the image C and the image D (here is supposed a case where F4 or more is selected as the aperture). The then operations of the control circuit 101, the sensor driving circuit 111 and the line sensor SA will now be described. When an accumulation starting signal STR is produced in the control circuit 101, the sensor driving circuit 111 outputs a clear signal CL to the line sensor SA, thereby clearing the charges in the photoelectric converting portions of the line sensors SAA, SAB and SAC, SAD. Thereupon, the line sensor SA starts the photoelectric conversion of the image being projected by the secondary imaging lens 12 disposed in the preceding stage and also starts the charge accumulating operation. When a predetermined time elapses after said operation is started, the sensor driving circuit 111 outputs a transfer signal SH to the line sensor SA, thereby transferring the charges accumulated in the photoelectric converting portion to the CCD portion. At the same time, the sensor driving circuit 111 outputs an accumulation end signal END to the control circuit 101, and waits for a CCD driving clock CK being input from the control circuit 101. When the CCD driving clock CK is input, the sensor driving circuit 111 produces CCD driving signals $\phi_1$ and $\phi_2$, and outputs these signals to the line sensor SA. When the CCD driving signals $\phi_1$ and $\phi_2$ are input to the line sensor SA, the line sensor SA outputs an analog image signal SSA to the control circuit 101 in accordance with these signals. Thus, the control circuit 101 A/D-converts the analog image signal in synchronism with the CCD driving clock CK, obtains image signals A(i) - D(i), calculates the phase differences $X_1$ and $X_2$ i.e. the focus detection signal, by a conventional operation system, and outputs this data to the lens control circuit 107. The lens control circuit 107 receives the data and controls the photo-taking lens 3 by a conventional driving system.

When a second stroke of the release button is then effected, the main mirror 5 and the sub-mirror 6 are moved up and the forward curtain of the shutter 15 is moved while, at the same time, the flashlight device 16 starts to emit a light. Thus, the flashlight is reflected by the surface of the object to be photographed, and this reflected light passes through the photo-taking lens 3 to the film, whereupon the photographing of the object image onto the film is started. Also, part of the light beam having thus entered the film is reflected by the surface of the film, and passes through the field lens 11 to the flashlight control sensor 14, and the photometric signal received and photoelectrically converted thereby is output from the TTL flashlight control circuit 109 to the control circuit 101. Thereupon, the control circuit 101 detects that exposure has reached proper exposure, whereupon it outputs a light emission stopping signal to the flashlight device, and then moves the rearward curtain of the shutter 15 through the shutter control circuit 103. Thereafter, the film is wound up and thus, a series of photographing operations are terminated.

According to the present embodiment, the stop aperture portions 22a, 22b and 22c, 22d of the stop 22 are formed so that the areas on the exit pupil of the phototaking lens 3 corresponding to the longitudinal distance measuring portion and the lateral distance measuring portion, respectively, do not overlap each other and moreover one of them lies outside the other, and this leads to the following effects.

(1) Two pair of stop aperture portions can be formed on a single member and therefore, in spite of being a focus detecting optical system of a very simple construction comprising the single secondary imaging lens 12 and the line sensors SAA-SAD disposed on a single substrate, enhancement of the focus detection accuracy by rapid change-over of AF and longitudinal and lateral distance measurements become possible at one time. That is, where the outer area on the exit pupil is used, the spacing between the pair of line sensors SAC and SAD is long as compared with the spacing between the line sensors SAA and SAB and therefore, highly accurate distance measurement is possible, and this agrees with the requirement that focusing of higher accuracy is necessary in brighter lenses of shallower depth of field, and moreover, where as in the case of a horizontal-line object to be photographed, no object information is present in the longitudinal distance measuring portion, a can be made to the lateral distance measuring portion and thus, there will be no awkward object to photograph.

If the inner area is directed to lenses brighter than F5.6 and the outer area is directed to lenses brighter than F2.8, the device of the present embodiment will become usable for almost all of the interchangeable lens groups for a single-lens reflex camera generally comprised of a lens brighter than F5.6.

(2) Two-direction distance measurement is made possible only for bright lenses, that is, the longitudinal distance measuring portion lies outside on the exit pupil, and therefore, the inner area corresponding, for example, to F5.6 lens can be used for only the lateral distance measuring portion, and in this case, the focus detecting device of the present invention is equal in quantity of light to the focus detecting device of the one-direction distance measurement type according to the prior art. Accordingly, it never happens that the low luminance operation limit is aggravated by making the two-direction distance measurement possible.

Also, according to the present embodiment, there are provided a cylindrical surface 24c having as its axis the direction orthogonal to both of the direction of the pair of line sensors SAA and SAB and the optic axis and a bent portion 25b bent in the direction orthogonal to both of the direction of the other pair of line sensors SAC and SAD and the optic axis, and this leads to the following effects:

(1) Adjustment of inclination becomes possible independently for the lateral distance measuring portion and the longitudinal distance measuring portion, respectively, and any focus detection error resulting from inclination can be eliminated.

(2) This mechanism can be realized with the number of components reduced greatly. Thus, the device can be incorporated into the lower portion of a camera.

Further, according to the present embodiment, a secondary image is formed on the line sensors SAA and SAB and a defocused secondary image is formed on the line sensors SAC and SAD, and the stop 22 is made movable in a direction perpendicular (or substantially perpendicular) to the optic axis 4, and this leads to the following effects:

(1) It becomes possible to adjust the projected positions on the primary imaging surfaces of the line sensors forming a pair so as to coincide with each other, that is, it becomes possible to adjust the relative positional relation between the line sensors and the secondary imaging lens, and even when the object to be photographed includes slant lines, accurate focus detection can be accomplished.

(2) Even in the case of two-direction distance measurement, said adjustment is possible for the respective directions.

(3) By defocusing the secondary image, a low-pass effect is created, and there is no wrong distance measurement even when the spatial frequency of the object to be photographed includes a high frequency component.

Although the present embodiment has been described with respect to the case where the line sensors are arranged in a plurality of directions, similar effects can also be obtained in a device wherein the line sensors are arranged only in one direction. However, the construction as shown in the present embodiment enables more accurate focus detection to be accomplished. Also, the pair of line sensors are disposed orthogonally to each other, whereas this is not restrictive. Further, as shown in FIG. 13, the sensor surface H is disposed at the preceding stage of the secondary imaging surface J, but alternatively, it may be disposed at the succeeding stage of the secondary imaging surface J.

We claim:

1. A focus detecting device comprising:
   a plurality of secondary imaging optical systems each forming a pair of light distributions whose relative positions vary in conformity with the focus adjusted state of an objective lens with respect to an object image, the secondary imaging optical systems being disposed so that a direction in which the relative positions of one of said pair of light distributions varies is different from a direction in which the relative positions of another of said pair of light distributions varies;
   an objective lens having a pupil through which pass the pairs of light distributions; and
   a plurality of focus detecting sensors for receiving the pairs of light distributions,
   wherein said plurality of optical systems are disposed so that a first optical spacing between areas of said pupil through which the light distributions of said one pair pass differs from a second optical spacing between areas of said pupil through which the light distributions of said another pair pass, each optical system comprising a pair of lenses.

2. A focus detecting device according to claim 1, wherein each of said optical systems is provided with (1) positive lens components disposed symmetrically with respect to an optic axis of said objective lens, and (2) a stop having openings opposed to said positive lens components.

3. A focus detecting device according to claim 1, wherein a straight line parallel with said first optical spacing and a straight line parallel with said second optical spacing are orthogonal to each other.

4. A focus detecting device according to claim 1, further comprising:
   a sensor holding member for holding said focus detecting sensors;
   first adjusting means for adjusting an amount of inclination of said sensor holding member in a first direction; and
   second adjusting means for adjusting an amount of inclination of said sensor holding member in a second direction orthogonal to said first direction.

5. A focus detecting device according to claim 4, further comprising a stop having openings defining the pupil areas through which the pairs of light distributions pass, said stop having third adjusting means for displacing the stop in a direction orthogonal to the first direction.

6. A device for detecting the focus adjusted state of an objective lens having a pupil, comprising:
   first secondary imaging optical means, having an optical axis, for forming a pair of light distributions whose relative position varies in conformity with the focus adjusted state of said objective lens, said first secondary imaging optical means comprising a pair of lenses;
   second secondary imaging optical means, having an optical axis, for forming a second pair of light distributions whose relative position varies in conformity with the focus adjusted state of said objective lens in a direction differing from the direction in which the relative position of said first pair of light distribution varies, said second secondary imaging optical means comprising a pair of lenses;
   sensing means having a first plurality of sensing elements for receiving said first pair of light distributions and a second plurality of sensing elements for receiving said second pair of light distributions;
   processing means for processing the output of said sensing means and forming a signal indicative of the focus adjusted state of said object lens; and
   light beam regulating means having apertures defining (1) a first pair of areas in which light beams forming said first pair of light distributions pass through the pupil of said objective lens, and (2) a second pair of areas in which light beams forming said second pair of light distributions pass through the pupil of said objective lens, for regulating said light beams, a spacing between said first pair of areas being smaller than a spacing between said second pair of areas.

7. A device according to claim 6, wherein said light beam regulating means comprises a stop having two openings with differently-oriented longitudinal axes.

8. A device according to claim 7, further comprising means for adjusting said stop in a direction perpendicular to the optical axes of said first and second secondary imaging optical means.

9. A device according to claim 6, further comprising adjusting means for independently adjusting, in two different directions, an inclination of a surface of said sensing means.

10. A device for detecting the focus adjusted state of an objective lens having a pupil, comprising:
    optical means for forming a plurality of light distributions whose relative position varies in conformity with the focus adjusted state of said objective lens, said optical means having an optical axis, said optical means comprising first and second optical systems each having a pair of lenses, a spacing between the first pair of lenses being different than a spacing between the second pair of lenses;
    sensing means for sensing said light distributions being displaced toward the optical axis from a predetermined imaging surface of said optical means, and providing an output corresponding to the sensed displacement;
    processing means for processing the output of said sensing means and forming a signal indicative of the focus adjusted state of said objective lens;
    a stop having openings defining areas in said objective lens pupil through which said light distributions pass; and
    adjusting means for moving said stop in a direction perpendicular to the optical axis of said optical means to thereby adjust the position thereof.

* * * * *